Dec. 27, 1927.  1,653,672
R. L. SHRINER
WATER HEATER
Filed March 6, 1926  2 Sheets-Sheet 1
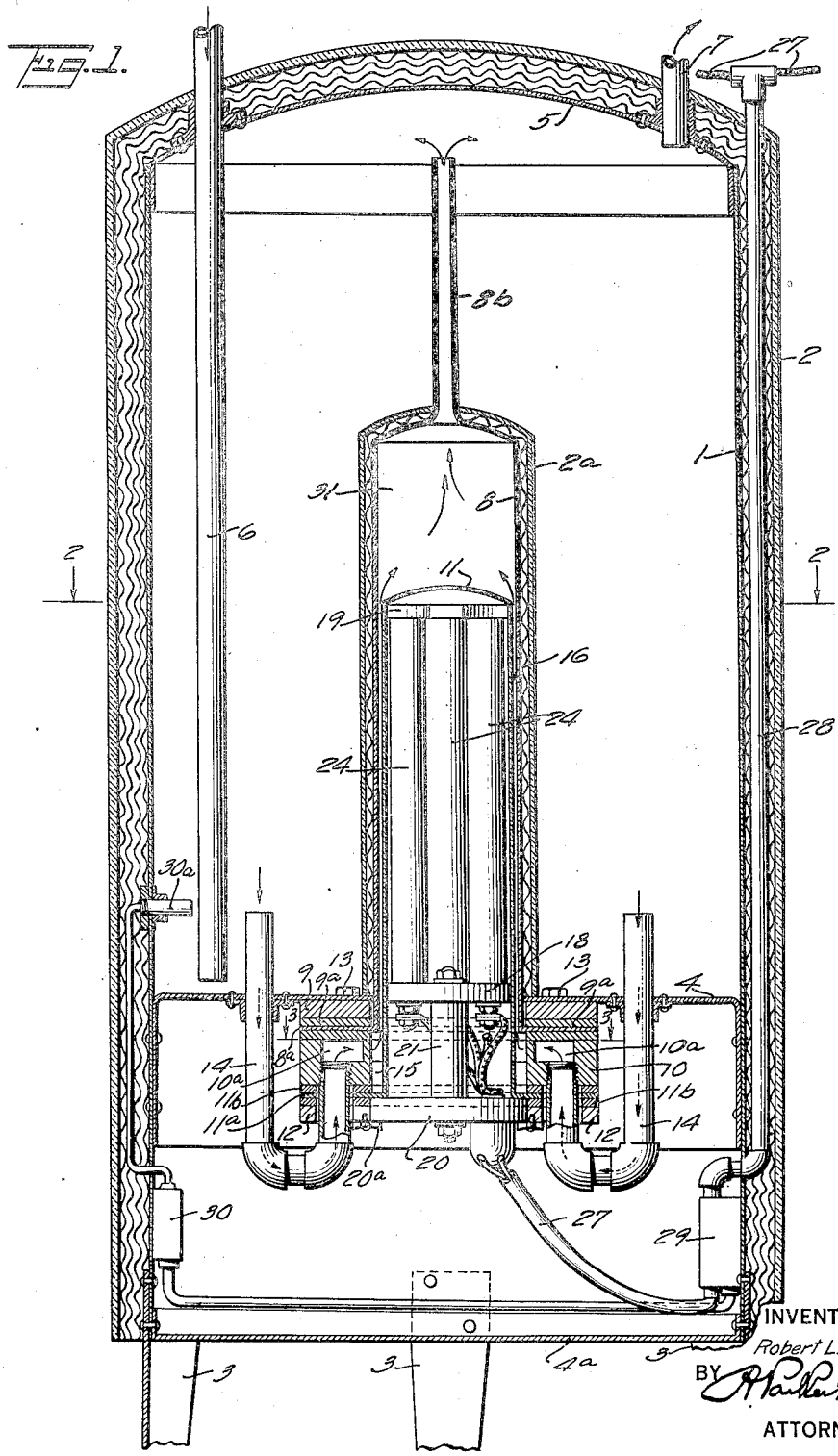
INVENTOR
Robert L. Shriner
BY
ATTORNEY Dec. 27, 1927.  
R. L. SHRINER  
WATER HEATER  
Filed March 6, 1926  
1,653,672  
2 Sheets-Sheet 2
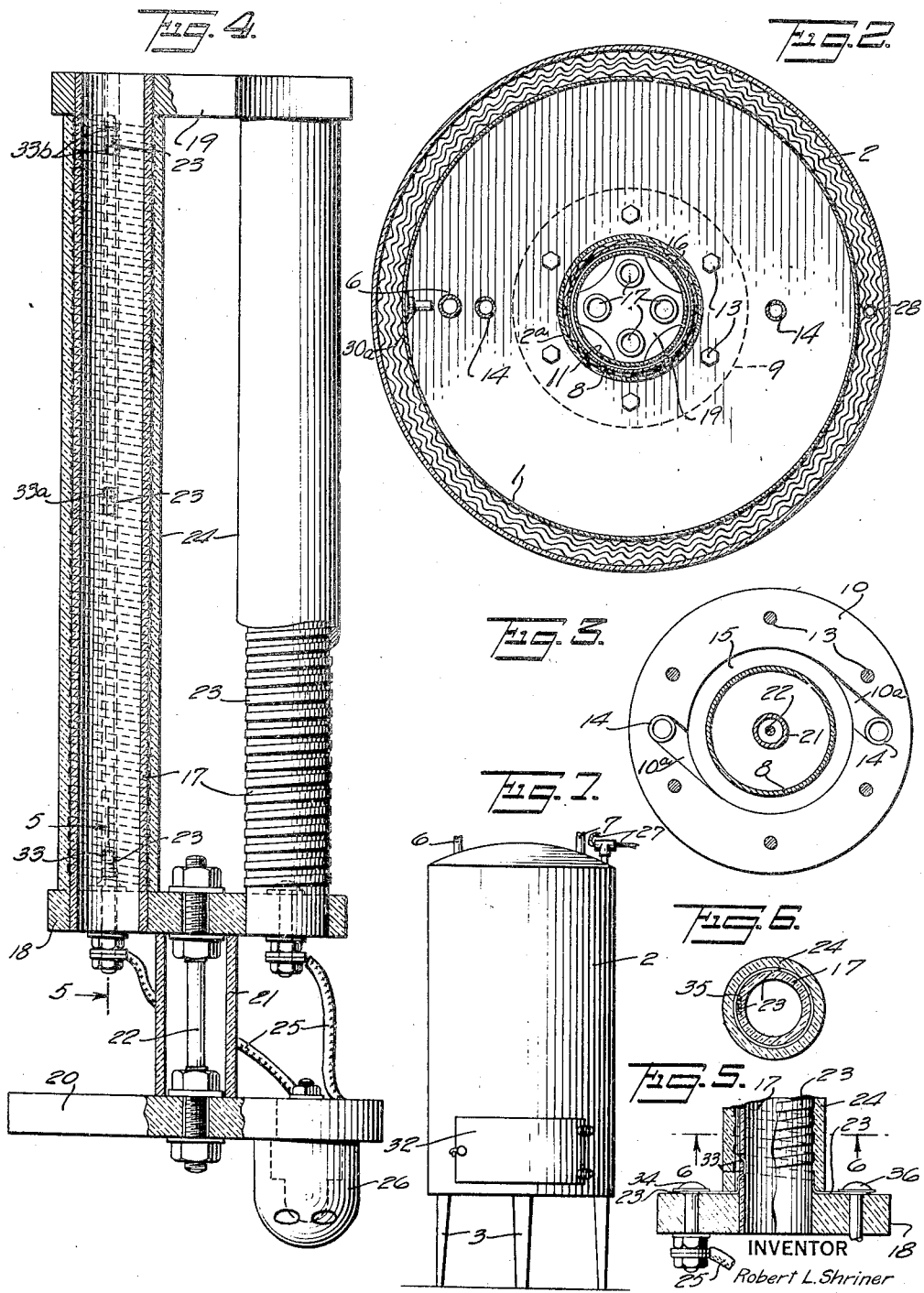
INVENTOR  
Robert L. Shriner  
BY  
ATTORNEY Patented Dec. 27, 1927.

1,653,672

UNITED STATES PATENT OFFICE.

ROBERT L. SHRINER, OF WEEHAWKEN, NEW JERSEY, ASSIGNOR TO HUDSON HEATING SYSTEMS, INC., OF NEW YORK, N. Y., A CORPORATION OF NEW YORK.

WATER HEATER.

Application filed March 6, 1926. Serial No. 92,711.

My invention relates generally to apparatus for the rapid and efficient heating of water and is more especially designed to produce a convenient and efficient electrically operated heater for supplying hot water for domestic uses in competition with the many forms of such heaters now on the market and designed to burn illuminating gas.

To this end, the preferred form of the invention comprises a vertical, cylindrical water container having an electrically operated heater located in a smaller cylinder placed in the lower central portion of the water container and surrounded by a cylinder of slightly greater diameter, connected to the water space at the bottom and top of the water container, and means for delivering currents of water from the bottom of said container to the narrow annular space between the heater proper and the last mentioned cylinder in a tangential direction, whereby said currents of water will pass in a helical path upwardly through said annular space in relatively thin films which can be effectively heated therein and then delivered to the upper portion of the water container. The best form of apparatus at present known to me embodying my invention is illustrated in the accompanying two sheets of drawings in which:

Fig. 1 is a vertical, central section of the main portion of the heater with connections and legs broken away, Fig. 2 is a horizontal section on line 2—2 of Fig. 1, Fig. 3 is a horizontal, partial section on line 3—3 of Fig. 1 showing portions of the water passages.

Fig. 4 is a partial vertical section, and partial elevation of two of the heater elements, with parts broken away, their supports, and connecting wires.

Fig. 5 is a detail, vertical section on line 5—5 of Fig. 4.

Fig. 6 is a horizontal section on line 6—6 of Fig. 5, and

Fig. 7 is a front elevation of the complete heater on a smaller scale with water connections broken away.

Throughout the drawings like reference characters indicate like parts. 1 represents the outer cylindrical shell of the water container usually made of steel and covered by any convenient form of non-heat-conducting lagging 2. Within this shell 1, the main water containing space is formed by top dome plate 5, also covered by the non-conducting lagging, and the base-plate 4, which is centrally perforated for receiving the heating element and its associated elements. The apparatus as a whole is supported by the legs 3, 3. 6 is the water intake, preferably consisting of a tube extending downward through the dome plate 5 nearly to the base-plate 4, and 7 is a water outlet, preferably located in the dome plate 5 and consisting of a tube terminating in the upper portion of the water containing space. 8 is an inner cylindrical shell, of considerably less diameter than the main shell, provided at its upper end with a vertical outlet tube $8^b$, which extends nearly to the top of the main water containing space, and at its lower end with an outwardly extending flange $8^a$, which latter forms a watertight joint with the base-plate 4 by means of the stiffening ring 9 and packing ring or gasket $9^a$, clamped together between said base-plate and said flange. $2^a$ is a non-heat-conducting lagging on the exterior of shell 8, the outer surface of which lagging is formed of waterproof material. 10 is a water distributor preferably formed of a ring provided with a plurality of passageways $10^a$, $10^a$, discharging through the inner surface of the ring tangentially thereof and connected by goose-necks 14, 14, with the lower portion of the main water space by passing through openings in the base-plate 4. Preferably, the intake ends of these goose-necks are located at a slightly higher level than the lower end of the main water intake tube 6.

11 is a heater shell of metal of slightly less diameter than the shell 8 and concentric therewith, closed at the top and having an outwardly extending flange $11^a$ at its bottom which is perforated to permit the passage of the shorter ends of the goose-necks 14, 14 and which flange makes a watertight joint with distributor 10 by means of packing rings $11^b$ on either side thereof; all of the above described flanges and packings being forced together by assembly bolts 13, 13 connecting a bottom ring 12 with the base-plate 4. Upper ring 9 may be welded to base-plate 4.

The above described construction evidently forms an annular base chamber 15 connected with an upper annular chamber 16 of considerably less width, the latter being located between the heater shell 11 and the cylindrical inner shell 8, with the water passages 10ª discharging tangentially into these connecting annular spaces. If then, a heating element of any desired construction is located inside of the heater shell 11 it is evident that the water in the annular upper chamber 16 will be rapidly heated and rise therein to the mixing and heating chamber 31 above the heater, formed in the upper portion of the inner shell 8 by reason of the fact that the heater shell 11 is considerably shorter than said shell 8, and that said heated water will thence pass through the tube 8ᵇ to the upper portion of the main water containing space in the heater, the cooler water in the lower portion of said space being forced downward through the goose-necks 14 into the tangential passages 10ª from which it will be discharged in whirling currents to pass again upwardly through the annular chamber 16 in helical paths. This whirling movement of the water in the heating zone results in several advantages. It prolongs the time and path of exposure of the jets of water to the heater shell 11 for any given height of such shell. It more effectively mixes the incoming cold water with the partially heated water in annular chamber 16 around shell 11, and the newly heated water coming from chamber 16 with that remaining in mixing chamber 31. It tends to prevent the deposition of sediment in the annular chamber 16.

The preferred form of heater for insertion in the heater shell 11 is shown in detail in Figs. 4, 5 and 6 and consists of a plurality of tubes 17, formed of some refractory non-conducting substance such as a composition of asbestos, set in a lower spider 18 and upper spider 19 also of refractory non-conducting material, on which tubes are wound coils 23 of a suitable high resistance wire or ribbon covered and held properly spaced apart by exterior bodies of refractory cement 24, 24. These coils are connected together and to terminals on the lower side of spider 18, from which terminals wires 25 extend to a terminal plug 26 located on the under side of the disc 20, which disc fits into bottom ring 12 and supports the spider 18 by means of the bolt 22 passing through the two and through the spacing sleeve 21. The above described construction evidently constitutes an electrical heating unit which can be inserted in the heater shell 11 and held there by the clips 20ª screwed to the under side of the ring 12 and projecting under the disc 20.

As shown, the main shell 11 extends some distance below base-plate 4, thereby forming an air space containing the lower portion of the heater element and the water distributing system, this air space being closed by the bottom plate 4ª and accessible through the door 32 shown in Fig. 7. In this air space is located the terminals of the supply circuit 27, any convenient form of automatic circuit controller located in the casing 29, and an aquastat 30, one member of which extends upward into the main water containing space, as at 30ª.

28 is a tube embedded in the lagging 2 and forming a conduit for the wires of the supply circuit 27.

The preferred method of winding coils 23 upon tubes 17 is shown in detail in Figs. 4, 5 and 6 where one end of a coil 23 is shown as passing through a pair of holes 33, in a tube 17 and anchored to a binding post 34 on spider 18. The conductor is usually formed of a thin ribbon of nichrome alloy and is next laid in a longitudinally extending groove 35 in the exterior of the tube 17, and led therein to the upper end of said tube, being also laced through several other sets of similar holes, as 33ª and 33ᵇ. Groove 35 is then filled with cement which covers the portion of ribbon therein, and the remainder of the ribbon is wound spirally around the tube with its free end anchored to a secnd binding post 3 on spider 18. The exterior coating 24 of cement is then applied and the whole baked slowly as by first passing the maximum amount of current through the ribbon, and afterward placing the whole structure in an oven. This gives the ribbon a chance to expand the necessary amount under the degree of heat to which it will be subjected in use and thereby form a spiral recess in the surrounding, still yielding mass of cement before the latter is subsequently hardened by the final baking. As a result the ribbon in the completed heating element rests in a spiral conduit having a dimension radially of the coil sufficient to accommodate all subsequent expansions and contractions of the coil and so avoiding possibility of such expansions cracking the cement envelope during operation of the heater. In the same way the initial longitudinal expansion of that portion of the ribbon lying in longitudinal groove 35, frees it from adhesion to the overlying cement, and, after that cement becomes rigid from the completed baking, further expansion of the ribbon is taken up by free play of the portions thereof forming the loops passing through holes 33, 33ª, etc. into the tube interior.

The mode of operation of my invention is as follows: The inlet tube 6 being connected to a source of water supply, and the outlet tube 7 to the hot water distributing pipe system, the main water containing space is filled and the electrical current turned on from the supply circuit 27. Thereupon the resistance coils 23 become intensely heated and this heat is radiated, and conveyed by the moving currents of air in the heater shell 11, to and through said shell, and to the thin film of water in the annular chamber 16, as well as to the larger body of water in the mixing chamber 31. The rapid, upward circulation of the water in helical paths through these spaces then is set up as previously described and the water in the main container is soon thereby heated to a predetermined point, whereupon the aquastat 30 operates to open the circuit controller in casing 29 and shuts off the current. As water is drawn from the heater and its temperature lowered to a predetermined point, the aquastat closes the electrical supply circuit and the operation is repeated. The intense heating and consequent rapid circulation of the water in the annular space 16 is heightened by the heat insulating action of the covering 2ᵃ of cylinder 8 which prevents, in large part, the direct radiation of the heat of this thin film of water through shell 8 to the cooler water in the lower part of the main water containing space.

Among the advantages of my invention may be mentioned the complete insulation of the entire apparatus against external heat radiation and consequent losses. Even the heat transmitted to the lower portion of the heating element projecting below the water space, and to the electrical connections in the chamber below the water containing space, such as the wires, circuit controller and aquastat, is delivered to the confined air beneath base-plate 4 and thereby transmitted to the water. Even the heat conducted to the circuit supply wires 27 is confined within the lagging 2 and largely transmitted to shell 1. As a result, every heat unit liberated by the flow of the electric current is applied to the water in the heater, and the rapid circulation of water produced by the helical circulation of a thin film thereof above described soon disseminates this heat equally throughout the entire volume of water in the apparatus, and promptly restores the predetermined temperature after each withdrawal of hot water by the users thereof. Repeated tests have shown that my invention compares favorably with the best form of gas water heater known to me both in efficiency, promptness of action and cost of operation where current is obtainable at usual city rates. Also the heater element is readily removable for replacement or repair and all interior parts are accessible through the door 32 so that clips 20ᵃ may be loosened and the heater element dropped into the air space below the water containing space for access to all the electrical connections.

The above described method of winding and embedding the conductor in expansion-permitting spaces prevents short circuits and ruptures, and coils thus installed have been kept in continuous operation under commercial conditions without appreciable deterioration for long periods of time.

An additional advantage resulting from the use of the non-heat-conducting covering 2ᵃ for the inner shell 8, in combination with the particular arrangement of water passages herein shown, results from the fact that when hot water is being rapidly drawn off the cold, incoming water from tube 6 collecting at the bottom of the main container, goes directly to the intensely heated annular space 16, is promptly heated therein, and then passes directly to the outlet pipe 7, thus promptly and adequately responding to the demands of a "peak load", and without diverting any substantial portion of the heat generated by the heating coils to the partial heating of the large body of cooler water in the lower two-thirds of the main container, because the latter body of water is insulated from the heater by the non-conducting covering 2ᵃ. It is only when such demand for an immediate large supply of hot water ceases, or is reduced, that the closed or loop system of circulation in the heater as a whole is resumed and the larger body of water in the lower part of the main container is then heated up to the predetermined temperature to operate the aquastat and also to build up a reserve of hot water for supplying future demands.

Various changes could be made in some of the details of construction described above, and some of them could be omitted without entirely departing from the principle of the invention or from its essential novelty, even if the full benefits above indicated were not completely realized after such modifications.

Having described my invention, I claim:

1. A water heater comprising, in combination, an outer shell, an inner cylindrical shell, a heater shell located in and concentric with said inner shell, and means for causing the water in said outer shell to circulate in a spiral path through the annular space between said inner shell and said heater shell from the lower part of the water space in said outer shell to the upper part thereof.

2. A structure such as described in claim 1, combined with a covering of water resistant, non-heat-conducting material for said inner cylindrical shell.

3. A structure such as described in claim 1 combined with an electric heater removably mounted in said heater shell.

4. A water heater comprising, in combination, a main water container, a vertical cylinder located in said container and having its upper end discharging into the upper portion of said main water container, a cylindrical heater located in and concentric with said vertical cylinder, and having an external diameter slightly less than the internal diameter thereof, a base ring connecting the lower end of said heater with the lower end of said cylinder and having a plurality of passages discharging tangentially into the annular space between the two, and a plurality of pipes leading from oppositely disposed lower portions of said main water container to said passages.

5. A structure such as described in claim 4 in which the said connecting pipes have their inlet ends some distance above the bottom of said water container, and above the water inlet thereto.

6. A combination such as defined in claim 4 in which said cylindrical heater comprises an exterior, watertight shell and a coil of wire of high electrical resistance mounted on an insulating supporting frame inserted in said watertight shell.

7. A combination such as defined in claim 4 in which said vertical cylinder extends a substantial distance above the upper end of said heater, whereby a water heating and mixing chamber of considerable capacity is formed in the upper end of said cylinder.

8. In a water heater the combination of a vertical, cylindrical water containing shell closed at the top and having a base-plate with a central opening therein, a strengthening ring surrounding said opening, an inner cylindrical shell having an opening of reduced diameter at the top, and an outwardly extending flange at the bottom, which flange is seated on said ring, a second ring seated against the exterior of said flange and provided with internal water passages opening into its interior, a cylindrical heater located in said inner cylindrical shell and having an outwardly extending flange on its lower end seated against the lower face of said second ring, means for clamping all of said flanges and rings to said base-plate, and a connection from the lower part of the interior of said water containing shell to the water passages in said second ring.

9. A combination such as defined in claim 8 in which said heater comprises a watertight shell, and coils of high electrical resistance conductors wound on tubes of non-conducting, refractory material mounted in spiders of similar material and adapted to be inserted in, or removed from, said shell as a unit.

10. In a water heater the combination of a main water-containing shell, an electric heater extending into said shell, a non-heat-conducting covering surrounding and completely enclosing said shell and heater and all immediate water and electrical connections thereto, a conduit embedded in said covering extending along one side of said shell and adapted to contain the supply wires for said heater and electric supply wires located in said conduit.

ROBERT L. SHRINER